US007723875B2

(12) United States Patent
Fakes

(10) Patent No.: US 7,723,875 B2
(45) Date of Patent: May 25, 2010

(54) BEARING AND COVER ASSEMBLY FOR A ROTATING ELECTRICAL MACHINE AND A ROTATING ELECTRICAL MACHINE CONTAINING SUCH AN ASSEMBLY

(75) Inventor: Michel Fakes, Seclin (FR)

(73) Assignee: Valeo Equipements Electriques Moteur, Creteil (FR)

( * ) Notice: Subject to any disclaimer, the term of this patent is extended or adjusted under 35 U.S.C. 154(b) by 0 days.

(21) Appl. No.: 12/245,885

(22) Filed: Oct. 6, 2008

(65) Prior Publication Data
US 2009/0108714 A1 Apr. 30, 2009

(30) Foreign Application Priority Data
Oct. 24, 2007 (FR) .................................. 07 58547

(51) Int. Cl.
H02K 9/00 (2006.01)
(52) U.S. Cl. ....................................................... 310/58
(58) Field of Classification Search .................. 310/58, 310/59, 62
See application file for complete search history.

(56) References Cited
U.S. PATENT DOCUMENTS
6,812,604 B2 * 11/2004 Braun et al. .............. 310/68 D
7,196,439 B2 * 3/2007 Pierret et al. .................. 310/58
7,400,070 B2 * 7/2008 Asao et al. ..................... 310/58

FOREIGN PATENT DOCUMENTS
| EP | 0 753 930 | 1/1997 |
| FR | 2 703 852 | 10/1994 |
| FR | 2 745 440 | 8/1997 |
| SU | 1 372 497 | 2/1988 |

* cited by examiner

Primary Examiner—Nguyen N Hanh
(74) Attorney, Agent, or Firm—Berenato & White, LLC

(57) ABSTRACT

Protective bearing and cover assembly, for an internally ventilated rotating electrical machine, has centrally an axially orientated axis and comprises on the one hand at least one electronic component carried by the bearing and protected by the cover having at least one radial opening for the passage of air, at least one axial opening for the entry of air, a generally axially orientated skirt and a generally transversely orientated base part, in which is located the axial air inlet opening, which is offset axially in relation to the radial opening for the passage of air, and on the other at least one shaft for the cooling of the generally axially orientated electronic component; the radial opening for the passage of air constitutes the outlet of the cooling shaft whereas the skirt constitutes one of the internal and upper walls of the cooling shaft. The rotating electrical machine consists of an alternator or a starter-alternator or an alterno-starter comprising such an assembly.

18 Claims, 12 Drawing Sheets

Prior Art

Prior Art

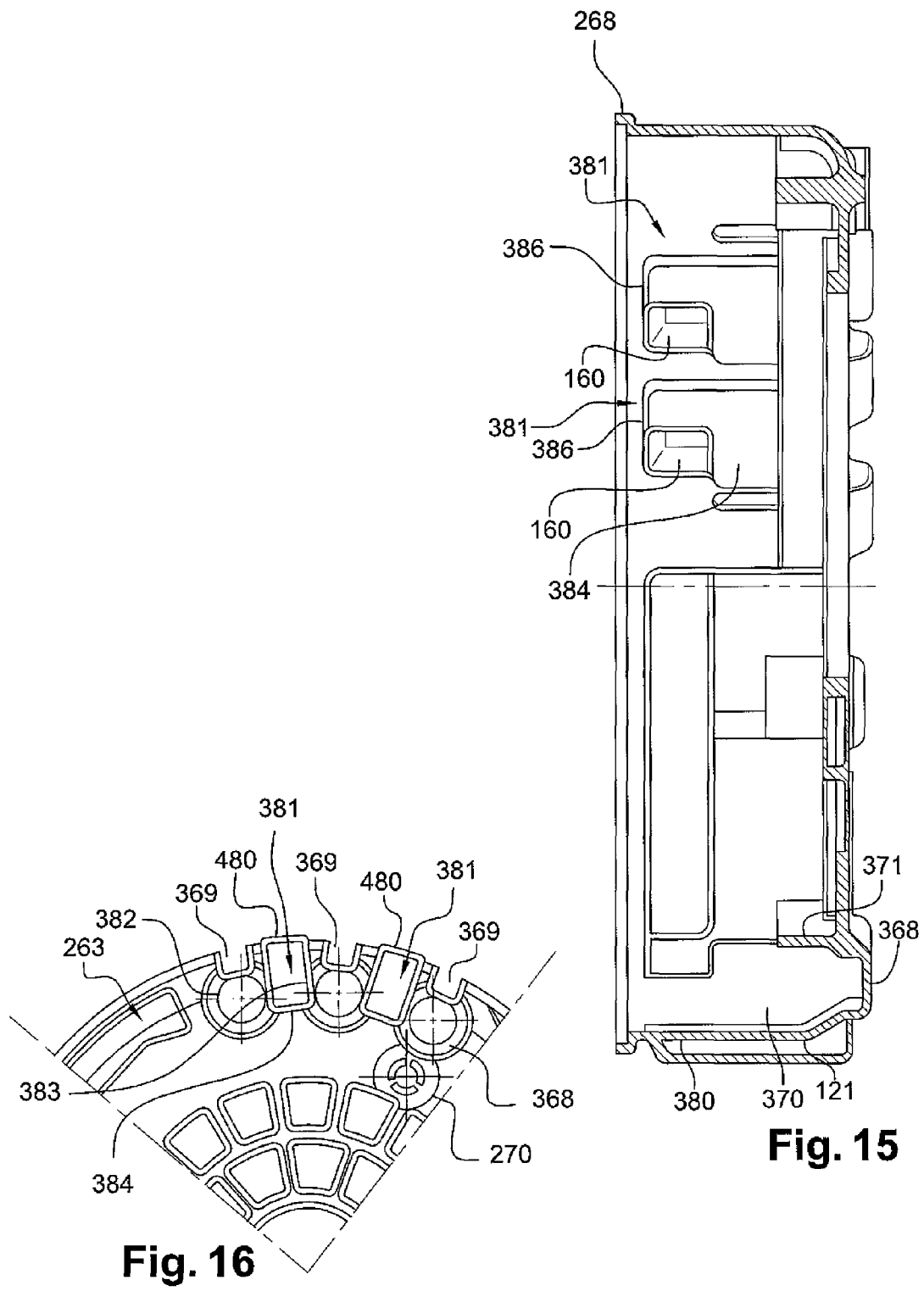

BEARING AND COVER ASSEMBLY FOR A ROTATING ELECTRICAL MACHINE AND A ROTATING ELECTRICAL MACHINE CONTAINING SUCH AN ASSEMBLY

This application is a U.S. Patent Application which claims priority of French Patent Application No. 0758547 filed Oct. 24, 2007 and is hereby incorporated by reference in its entirety.

FIELD OF THE INVENTION

The invention relates to a bearing/cover assembly for a rotating electrical machine with an internal ventilation system, such as an alternator or a starter-alternator for a motor vehicle, in which the cover encloses at least one electronic component and comprises at least one radial aperture for the passage of air, at least one axial aperture for the entry of air, a skirt and a base part accommodating the axial aperture for the passage of air.

The present invention also concerns a rotating electrical machine comprising a deflector of this type.

PRIOR ART

FIG. 1 contains a partial and schematic representation, shown in the form of an axial half-section, of a rotating electrical machine with an internal ventilation system in accordance with the prior art in the form of a multiphase alternator for motor vehicles of the type described in the document U.S. Pat. No. 7,019,424.

This machine comprises a device for the ducted circulation of a cooling means, such as air, a stator 3 having a coil and a rotor 40, which are housed in a casing provided with at least two end supports, referred to respectively as a front support and a rear support. Only the rear support 6 is visible in FIG. 1. One at least of the two end plates comprises a front face 164 and a peripheral, generally cylindrical skirt 161. One free end of this skirt is open while the other end is closed by the front face constituting the base part of the bearing. This bearing, shown here as a hollow shape, comprises fresh air inlet openings 18 arranged in the front face 164, and vents for the recirculation of hot air 162 arranged in the skirt 161. Each vent 162 comprises an axial portion extending into the skirt and a radial portion extending into a peripheral zone of the front face 164. Here, some of the vents 162 have a radial portion which is larger than the others. The openings 18 here are generally trapezoidal in shape.

The front and rear bearings are secured together, for example, by means of braces, forming the casing in which the stator 3 and rotor 40 are housed, as can be seen for example in the documents U.S. Pat. No. 7,019,424, EP-A-0 515 259 and U.S. Pat. No. 4,488,070.

For this purpose, the rear bearing 6 has a number of areas of greater thickness 267, each of which is perforated to allow the passage of a brace, which is screwed into a thicker portion of the front bearing as can be seen in for example in FIG. 1 of document EP 0 515 259.

A protecting cover 12, is also provided, shown here in an annular and hollow shape.

The cover is a protective cover having at least one electronic component mounted here on the rear bearing 6. This cover encloses this component.

More precisely, in the documents EP-A-0 515 259 and U.S. Pat. No. 7,019,424, this cover mounted on the rear bearing, whereas in the document U.S. Pat. No. 4,488,070, the cover forms a single unit with the rear bearing.

Electronic components, such as diodes 10, 10' or transistors of the MOSFET type, and/or at least one voltage regulator 165, are mounted inside the cover 12 and secured by the rear bearing 6 as shown in FIG. 2, which is a view in perspective and in exploded form of the rear of the alternator, identical to FIG. 8 of document U.S. Pat. No. 7,019,424. In this FIG. 2, the elements that are identical to those in FIG. 1 are assigned the same references.

The diodes 10, 10' belong to a current rectification device 90 to rectify the a.c. current produced by the coil in the stator 3 into a d.c. current to power the accessories and/or to recharge the battery of the motor vehicle.

This device 90 comprises a dissipater of positive heat 1, a dissipater of negative heat and a connector 9.

The dissipater 1 carries the set of diodes 10', described as positive diodes. It forms a single piece with the face 164 and is mounted on this latter in an electrically insulating manner, for example, by means of a screw, via the connector 9.

The reference 163 in FIG. 2 indicates a mounting clip of the alternator onto a fixed part of the motor vehicle.

In this embodiment, the negative dissipater 164 is formed from the face 164 of the bearing 6 and at the same time, no reference marks have been added for the holes drilled in this face for the purpose of mounting the diodes 10, each intended to be forcefully inserted into a hole. This dissipater 164 is described as the negative and the diodes 10 are described as negative diodes, because the bearing 6 is connected to the frame of the motor vehicle.

By way of an alternative, the negative dissipater is separate from the bearing 6 and is secured by this latter as described for example in document U.S. Pat. No. 4,488,070 cited above.

The dissipater 1 has a number of fins 4 around its internal periphery. The connector 9 carries the lugs 166.

The cover 12, with its annular and hollow shape, comprises, in the same way as the bearing 6, a peripheral and generally cyndrical shaped skirt having a number of radial openings 16 for the passage of air in an oblong shape and a base part 120 having two series of axial openings 144, 30 for the admission of air. The skirt 121 is closed at its furthermost end from the frontal face of the bearing 6 by a base piece 120. The openings 16 extend here circumferentially and in the vicinity of the frontal face 164 of the rear bearing 6. These openings 16 are radial openings for the admission of air and are offset axially in relation to the openings 144, 30.

The base part 120 also comprises axial air inlet openings 155 with regard to the voltage regulator 165 mounted on the face 164 of the bearing 6.

The skirt 121 also has a projection for the passage of the terminal 500, described as the terminal B+, intended to be connected via a cable to the positive terminal of the battery of the vehicle and it is for this reason that the dissipater 1 is described as a positive dissipater and the diodes 10', the positive diodes. This terminal 500 a part of the dissipater 1, here metallic, just as the bearing 6. The bearing 6 and the dissipater 1 are, for example, on a base of aluminium, whereas the cover 12 is, in this embodiment, made of a plastic material.

The skirt of the cover 12 has a number of projections 266, in a curved shape with each one receiving a clamp 166.

These projections 266 surround and thereby protect the clamps 166.

The clamps 166 constitute the ends stripped of all electrically conductive traces embedded in the contactor 9, here in an insulating plastic material.

The connector 9 also comprises a network of electrically conductive traces, the purpose of which is to connect the tails of the diodes 10, 10' as can be seen for example in FIG. 5 of the document U.S. Pat. No. 7,019,424.

Each clamp 166 is intended to be connected, here by crimping, to the outlet of one of the windings of the phases comprising the coil of the 3, here in a multiphase form. These outlets are visible, for example, in FIG. 7 of the document U.S. Pat. No. 7,019,424, to which reference will be made. These outputs cross the face 164 with the help of specific openings in the latter.

It will be seen that the face 164 has an annular shaped excess thickness 168 around its outer periphery for the purpose of centering the skirt of the cover 12, with the internal periphery being in close contact with the outer periphery of this area of excess thickness.

The free end of the skirt 121 comes into contact with the face 164 at the level of this excess thickness 168.

This cover 12 is secured by any appropriate means to the bearing 6. For example, the face 164 comprises a number of studs (not visible in FIG. 1) providing a pawl and ratchet joining system of the cover 12, the base of which has a series of mounting points 270 with radially arranged tabs intended to fit together with the threaded ends of the studs. For further information, reference is made to the document WO-A-01/69762, and in particular to FIG. 7 of the document. Alternatively, the securing is effected by means of a nut, which is screwed onto the threaded end of the stud or alternatively of a bolt.

FIG. 1 contains a schematic representation of a part of the other components or constituents of the alternator together with the rear part of FIG. 2 of this alternator, knowing that the stator 3 surrounds the rotor 40 leaving a small amount of play.

The rotor 40 is joined to a shaft 50 and comprises for example a claw type rotor, such as can be seen in the documents cited above or a rotor with projecting poles. This rotor comprises at least one excitation coil the ends of which electrically connected to the voltage regulator by means of collector rings, brushes and brush holders as described in the documents EP 0 515 259 and U.S. Pat. No. 4,488,070, to which reference will be made in due course. For the sake of simplicity, FIG. 1 does not show the collector rings, the brushes, the brush holders or the voltage regulator.

The longitudinal or the axial axis X-X of the shaft 50 represents the symmetrical and the rotational axis of the alternator.

The axis X-X also represents the longitudinal or axial axis X-X of the bearing 6/cover 12 assembly.

The skirt 161 of the bearing 6 and the skirt 121 of the cover 12 are generally axially orientated in respect of this axis X-X.

The base piece 164 of the bearing 6 and the base piece of the cover 12 are generally transversely orientated in respect of this axis X-X.

The shaft 50 is supported by a bearing, such as a set of ball bearings 7, housed in a suitable casing 60, which is arranged in the centre of the front face of the rear bearing 6. The stator 3 has a grooved body 20, for example in the form of a bundle of plates supporting the coil of the stator. This coil comprises at least one winding per phase. The windings cross the body of the stator and extend to both sides of the stator to form plates, one of which can be seen schematically as 21 in FIG. 1.

The windings are effected in a known manner on the basis of continuous conductor wires or alternatively on the basis of conductive segments joined by welding as described, for example in the document U.S. Pat. No. 7,019,424.

Advantageously, the welding of these segments is carried out at the level of the front plate.

The example shown contains six windings and thus 6 clamps 166. Clearly, this number depends on the applications and the number of windings and phases. This number can be alternatively three, five or seven.

The outlets of the windings are connected in the manner described above to the clamps 166 of the connector 9.

In a known manner, when the rotor 40 turns and when the excitation coil of the rotor is powered electrically, the rotor is magnetised and creates an induced current of the alternating type in the windings of the coil of the stator 3, requiring the current to be rectified into a direct current by means of a current rectifying device 90.

The tails of the diodes 10, 10' are connected to the electrically conductive traces of the connector 9 to form a bridge of diodes.

The current rectifying device 90, and the voltage regulator is covered in a manner described above by the protective cover 12 having openings 16, 144, 30, 155.

The radial openings 16 are important for the cooling of the rotating electrical machine.

In fact, the increasing electrical needs of motor vehicles means that alternators have to produce more and more electrical energy, and this in turn generates more heat. Consequently, significant improvements need to be made to their cooling, especially in the diode bridge. At the same time, the heat engines into which these alternators are to be installed are increasingly compact with the result that no further increase in the volume of these machines can be envisaged.

The radial openings 16 participate in this cooling effect without increasing the volume.

More precisely, the cooling of this alternator, and in particular, the rectifier device 90 and the windings of the stator, is effected by the ducted circulation of a cooling medium, such as air. The circulation is created by means of an internal ventilator 22 situated inside the rear bearing 6, concentrically to the skirt 161 of the bearing 6 that envelops it. This ventilator 22 comprises at least one circular plate 23 which is joined to one end of the rotor 40, shown here as a claw-type rotor, by means, for example, of welding. The circular plate 23 has a series of blades 24, which are arranged slightly to the right of the skirt 161 and below the plate 21.

The ventilator 22 draws in the fresh air axially through air ducts 16 and 144, 30 in the form of inlets, in the annular shaped cover 12 so that this flow of air cools in particular the bridge of the diodes 10, 10' and the voltage regulator 165. This airflow then crosses the front face 164 of the rear bearing 6 through the fresh air inlet openings 18, to be recirculated radially through the warm air recirculating vents 162, by the blades 24 of the ventilator 22.

The air, which is evacuated through the vents 162 also cools the plates 21 of the stator which border the internal surface of the skirt 161, in particular at the level of the recirculating vents 162.

Having regard to the configuration of the dissipater 1 with fins 4 and the openings 144, 30 in the cover 12, two airflows are obtained F1 and F2 as explained in the document U.S. Pat. No. 7,019,424 and visible in FIG. 5 of this document. For the sake of clarity, FIG. 1 does not show the flow of fresh air shown in FIG. 5 of this document U.S. Pat. No. 7,019,424, which flows through the openings 16 of the cover 12.

The aim of this is to highlight the flow of defective recycled air.

More particularly, the radial parts of the recirculating vents 162, which are provided to enable the bearing to be produced, are detrimental to the cooling process, as they generate swirlings in the flow of the recirculating air, which produces fluctuations in pressure and the recirculated air F' is ducted through the outer radial openings 16 of the cover together with the fresh air, knowing that the openings 16 are necessary to ensure a thorough cooling of the diodes and the other electronic components housed within the cover.

In this way, a defect in the recirculation of the air arises in that the recirculated air F' has the effect of heating the electronic component or components housed with this cover.

This phenomenon is even more marked if the size of the opening 16 is increased circumferentially and/or axially.

This phenomenon is best avoided by finding a solution that does not modify in any way the axial air inlet openings of the cover and that makes use of at least one radial airflow opening so as to preserve the arrangement of the electronic component or components.

It is also desirable to avoid any excessive increase in the radial dimensions of the rotating electrical machine at the level of the skirt around the bearings forming part of the casing of the machine.

It is also desirable not to modify the vents for the recirculating air for the bearings and to leave these free.

SUMMARY OF THE INVENTION

The aim of the present invention is to meet these requirements and thereby improve the cooling of the bearing/cover assembly by enclosing at least one electronic component without making any significant changes to the design of the bearing and retaining the axial air inlet openings of the cover.

In addition, the aim of the present invention is to propose a solution for the improvement of the cooling of the electronic component or components without incurring excessive additional manufacturing costs and without any excessive increase in the radial dimensions of the outer periphery of the bearing.

According to the present invention, the protective bearing/cover assembly for a rotating electrical machine with internal ventilation, having centrally an axially orientated axis and comprising at least one electronic component carried by the bearing and protected by the cover comprising at least one radial air inlet opening, one skirt generally axially orientated and a base piece generally transversely orientated, in which the axial air inlet opening is offset axially in relation to the radial air flow opening, is characterised in that it comprises at least one cooling shaft for the electronic component adjacent to the skirt of the cover, in that the cooling shaft is in general axially orientated, in that the radial opening of the air passage constitutes the outlet of the cooling shaft and in that the skirt constitutes one of the internal and upper walls of the cooling shaft.

According to the invention, the rotating electrical machine with internal ventilation consists of an alternator or a starter-alternator comprising a protective bearing/cover assembly as described.

The present invention has the effect of preventing the destructive effect of air being circulated after being reheated by the components installed in the casing of the rotating electrical machine.

In addition, the flow of air entering through the radial air inlet opening constituting the outlet of the cooling shaft is increased.

This has the effect of increasing the flow of air inside the cover.

The electrical component of components are thus effectively cooled.

The axial and/or the circumferential size of the radial opening can be increased in order to further increase the flow of air into the cover so as to improve the degree of cooling of the electronic component or components through the effect of the shaft.

In this way, in the case of the alternator shown in FIGS. 1 and 2, the flow of air passing between the diodes 10, 10' can be increased if the size of the radial opening 16 is increased through the effect of the shaft.

Moreover, there is no change in the axial air inlets in the base of the cover or in the layout of the electrical component or components inside the cover.

A part of the skirt is rearranged to be placed in a manner adjacent to the shaft, which is economical.

This shaft is offset axially in relation to the housing, more precisely in relation to the air recirculation vents, that is to say, in relation to the outer periphery of the bearing associated with the cover, in such a manner that it does not interfere with the latter and it does not affect the internal ventilation of the rotating electrical machine. In this way, the shaft does not have the effect of increasing the radial dimensions of the machine at the level of its housing.

As the machine in question is a rotating electrical machine in the form of an alternator or a starter-alternator comprising electronic components such as diodes or other current rectification components, such as MOSFET type transistors, and/or a voltage regulator protected by the cover, the effect is to maximise the reduction in the number of defects in the recirculation of the air leaving the stator of the machine and re-entering the cover and also to increase the flow of air within the cover.

In this way, the current rectification components, such as the diodes and/or the voltage regulator, can benefit from an inlet temperature that is close to the ambient temperature and also from an enhanced flow of air.

The temperature of the current rectification components and/or the voltage regulator is reduced with the result that the power of the rotating electrical machine can be increased as the temperature in the vicinity of this or these elements and/or of the voltage generator.

The operation of these components and/or the voltage regulator is thus more reliable. The temperature of the heat dissipaters is also reduced, which is beneficial for the reduction of losses through the Joule effect of the machine.

As the alternator is of the type shown in FIG. 2, the flow of air between the rear bearing and the positive dissipater is increased, resulting in a temperature that is very close to that of the ambient temperature.

If one or two of the negative diodes are hotter than the others, one or more shafts can be taken into use to create air inlets.

In a general manner, the temperature difference between the negative and the positive diodes can be reduced.

As a result of the present invention, all air inlets at the level of the cover are axially arranged; the air entry into the shaft is arranged axially while the arrangement of the outlet of the shaft is radial.

In accordance with other characteristics, taken either individually or in combination:

The shaft or shafts are formed from two separate parts, namely an outer part and an inner part, represented by the cover;

The shaft or shafts comprise a part covering all or part of the radial parts of the hot air evacuation vents of the bearing;

The shaft or shafts are part of a piece that forms a deflector to steer the air in the direction away from the cover;

The skirt constitutes the internal wall of the shaft;

The skirt constitutes the upper wall of the shaft;

The upper wall of the shaft is formed from a local indentation or from a local elevation of the skirt;

The internal wall of a shaft is formed from a local indentation or a local elevation of the skirt;

The lateral wall of the shaft are designed to strengthen the skirt and the base of the cover;

The base part of the shaft is shaped so as to produce a radial deflection of the airflow towards the interior of the cover.

The invention will now be described in greater detail and with reference to the attached drawings, which illustrate a non-limiting embodiment of the invention.

BRIEF DESCRIPTION OF THE DRAWINGS

FIGS. 13 to 15 are sections respectively along the lines 13-13, 14-14 and 15-15 of FIG. 12;

FIG. 16 is a part view similar to FIG. 12 for a ninth embodiment according to the present invention.

DETAILED DESCRIPTION OF THE EMBODIMENTS OF THE INVENTION

Figure 1:
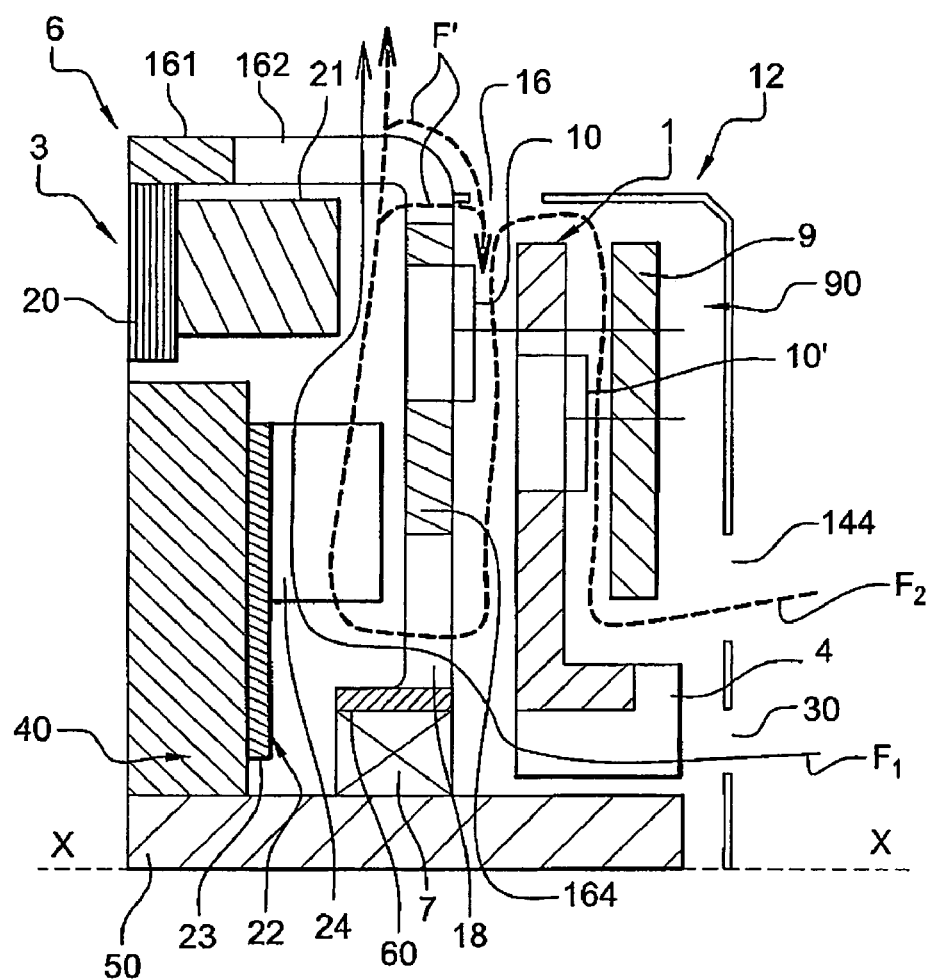
FIG. 1 is a partial half-section through an alternator of the type described above.

The same reference marks are used in the drawings for identical or similar components.

Figure 2:
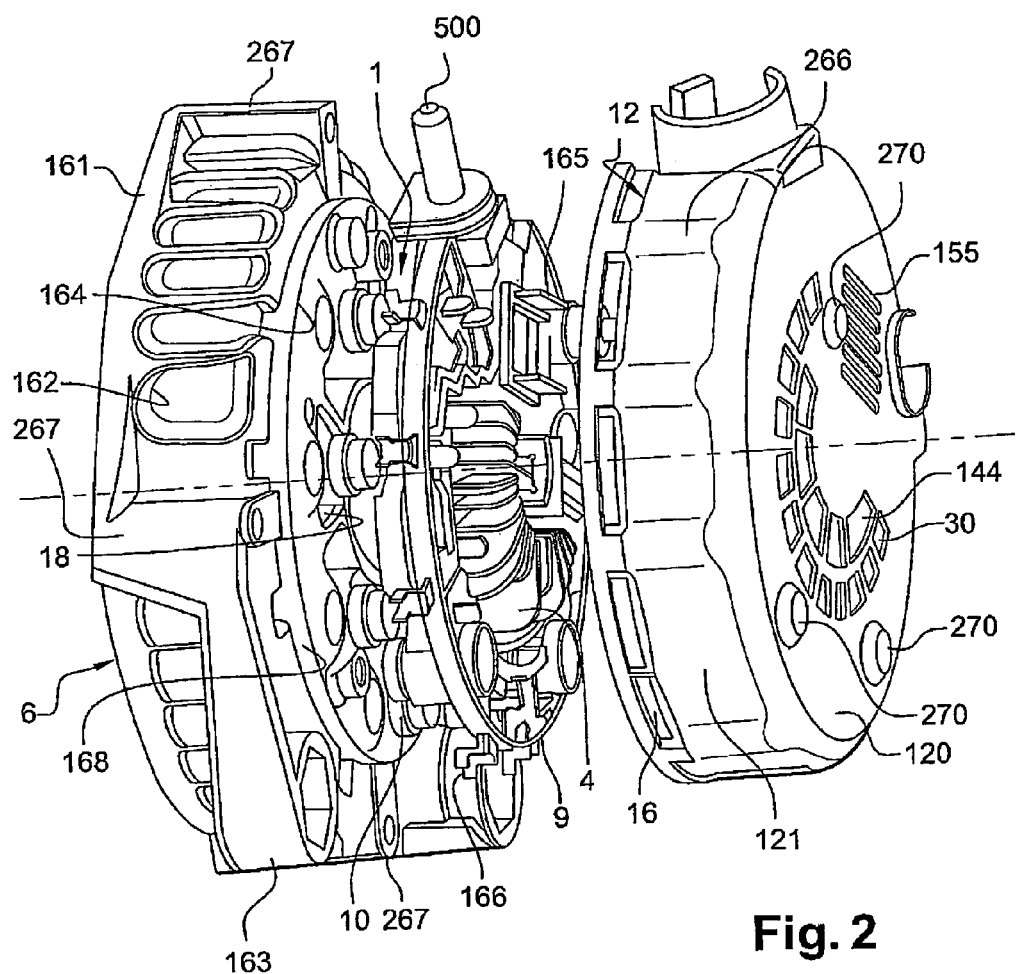
FIG. 2 is an overall view in perspective of a rear bearing of an alternator produced by axially moulding used in the prior art and in the invention.

For the general construction of an alternator in the form of a rotating electrical machine, reference is made to FIGS. 1 and 2 and to the two other documents cited above. The following description only relates to the aspects of the invention.

As in the previous figures, the bearing/protective cover assembly shows centrally a longitudinal or an axial axis X-X, which is merged into the axis X-X of the rotating electrical machine.

The skirt of the bearing and the skirt of the cover are generally axially orientated in relation to this axis X-X.

The base part of the gear and the base part of the cover are generally transversely orientated in relation to this axis X-X.

The radial and axial directions are defined in relation to this axis X-X. The same applies to the axial and transverse orientations.

The figures show the formation of a rear bearing 6/protective cover 12 assembly.

The hollow shaped cover 12 is part of the bearing 6, which has at least on electronic component protected by the cover, which surrounds and encloses this component.

In the first embodiment shown in FIGS. 3 to 5, 120 marks the transversely orientated base part and 121 marks the outer peripheral skirt of the axially orientated generally cylindrically shaped cover 12.

The base part 120 closes off the skirt 121 at the end of the latter, the furthermost from the base of the bearing 6.

In the present embodiment, this cover is in a mouldable material.

In the present embodiment, the material is a mouldable plastic. Alternatively, it is in aluminium.

The cover 12 encloses at least one electronic component 10, 10', 165 in the manner referred to above. This is therefore a protective cover, which encloses the electronic component 10, 10', 165 arranged in the space bordered by the base part 120 and the face 164 of the bearing 6.

The base part 120 is fitted with at least one axial air inlet opening, here in the form of a number of axial air inlet openings 155, 144, 30 as shown in FIGS. 1 and 2. For the sake of simplicity, the mounting points 270 have not been shown. The same applies to FIGS. 6 and 7.

The skirt 121 surrounds the current rectification device 90 and shows, at the level of the free open end that is adjacent to the front face of the bearing 6, at least one radial air inlet opening 16.

In this embodiment, the skirt 121 reveals a number of radial openings 16 in an oblong shape and adjacent to the free of the skirt as shown in FIG. 2. These openings 16 are closed and axially offset in relation to the air inlets 144, 30, 155 and thereby in relation to the base piece 120. A strip of the material of the skirt exists between the outer axial edge of the opening 16, the furthermost from the free end of the skirt 121, and the base piece 120.

The cover 12 forms a single piece with the bearing 6. In one embodiment, the cover forms a single piece with the bearing and is a monobloc component with this latter. In this embodiment, the cover forms a single piece with the bearing and is secured by a ratchet mechanism or by screwing as shown in FIGS. 1 and 2 onto the rear bearing 6 belonging to the casing of the alternator, serving as a housing (FIG. 5) for the stator 3 and the rotor 40 and surrounded by the stator in the manner described.

In this embodiment, as in the other embodiments, part of the axial offsetting of the openings 16 is arranged in relation to the base piece 120 and the presence of the skirt 121.

In this way, the cover 12 is provided—in accordance with one characteristic—with at least one cooling shaft 200, at least one electronic component carried by the bearing, here a negative 10 and/or a positive 10 diode, which, by way of alternative, can be replaced by a MOSFET type transistor, or any other electronic current rectifying component.

Figure 5:
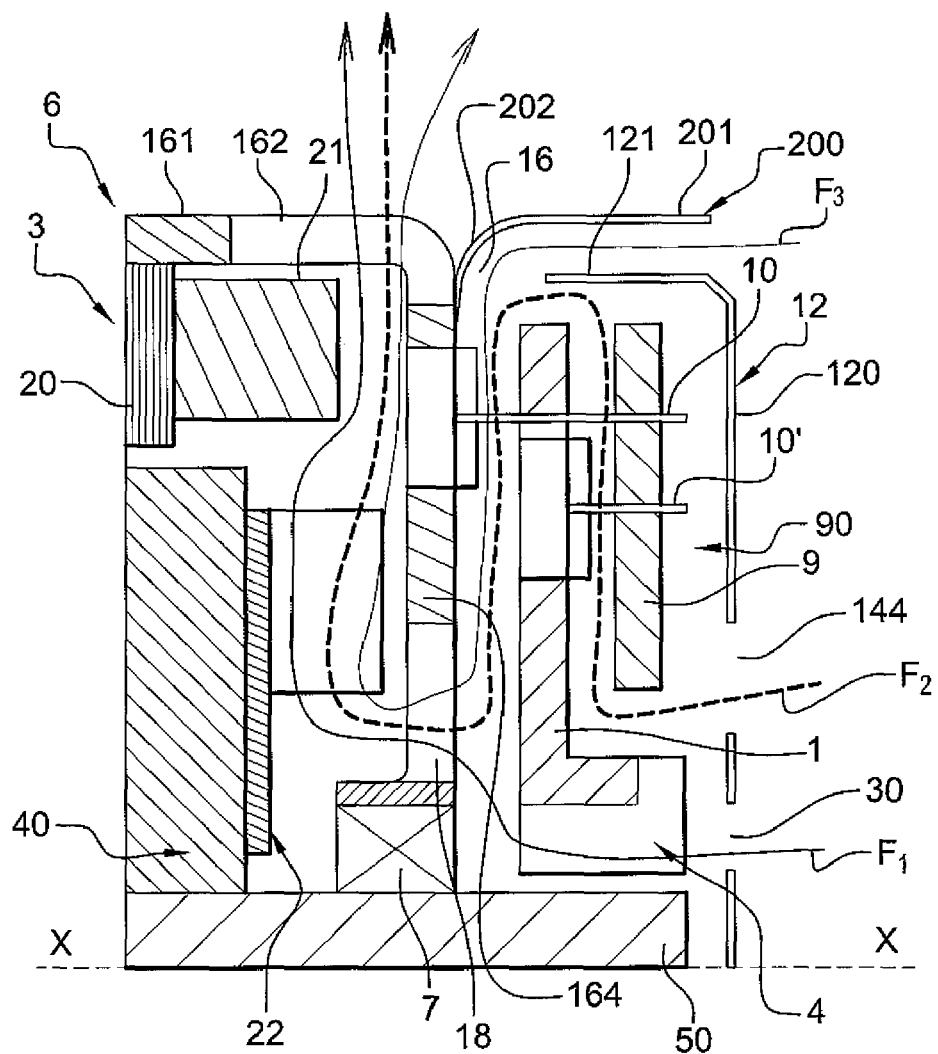
FIG. 5 is a partial half-view of a section through an alternator figured with a cover shown in FIGS. 3 and 4.

The shaft 200 is axially orientated in relation to the axis X-X of the alternator as can be seen in FIG. 5. This shaft is axially offset in relation to the air circulation vents 162 and here to the casing of the alternator. The shaft is thus offset or shifted axially in relation to the outer periphery of the rear bearing 6 comprising the vents 162. The same is true of the other embodiments.

According to one characteristic, this shaft is adjacent to the skirt 121 of the cover and allows the airflow between the face of the bearing 164 of the bearing 6 and the positive dissipater 1 to be increased in the manner described below. In this way, the diodes 10, 10', or any other electronic current rectification component, are exposed to a temperature that is very close to the ambient temperature and an enhanced flow of air. The same applies in the alternative form of the voltage regulator.

This shaft is bordered by an upper wall 201, by a lower or and internal wall formed in accordance with one characteristic by the skirt 121 of the cover 12, by an outer curved wall 202 and by two lateral walls 203, 204 generally of a radial orientation. These walls 203, 204 are axially extended. Their axial dimension is greater than their radial dimension.

The shaft 200 is thus adjacent to the skirt 121 and extends in the form of a radial projection to the outside of the skirt 121.

The walls 201 to 204 are shown in the figures as being monoblocs with the cover 12 and are moulded with the cover 12, here in a plastic material. The shaft 200 is in the form of a low height or low thickness axially orientated protuberance arranged at the outer periphery of the cover 12. The wall 202 is in the form of a profiled deflector, which directs the air radially towards at least one opening 16 associated with a negative 10 and/or a positive 10' diode. This wall 202 extends for the greater part above and to the outside of at least one opening 16 arranged in the vicinity of a negative and/or positive diode for the enhanced cooling of the latter.

The upper wall 201 is axially orientated and extends the wall 202, to the end of which it is joined, in an axial direction. This wall 201 extends axially as far as the level of the base 120 of the cover in such a way that there is no increase in the axial dimension of the cover. Circumferentially, the wall 201 has the shape of a circular sector.

The free end of the wall 201 forms part of the entry of the shaft 200, while the wall 202 constitutes the base of the shaft and—according to one characteristic—the opening or openings 16 of the shaft outlet.

The opening 16 is bordered for the greater part by the axially orientated skirt 121 representing the inner wall of the shaft. The opening 16 is blind at the level of the skirt 121 and is closed by the wall 202, which is less thick than the part of the wall of the skirt shown in FIG. 2 between the opening 16 and the free end of the skirt.

Because of the presence of the shaft, it is also possible to increase the circumferential and/or the axial size of the opening 16. In this way, a greater amount of air can enter the interior of the cover.

Figure 4:
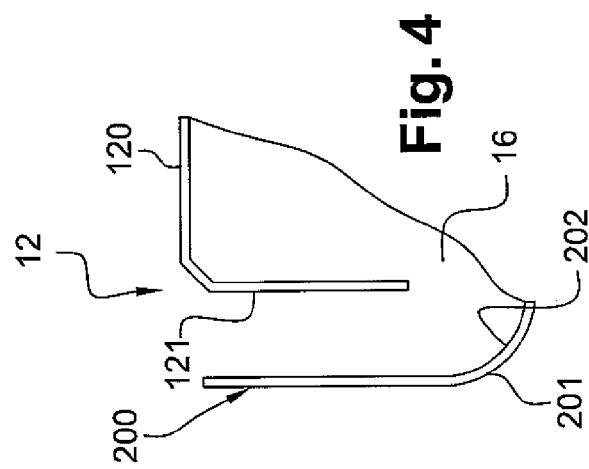
FIG. 4 is a section along the line 4-4 of FIG. 3.

FIG. 4 shows a slight radial offsetting between the free end of the wall 202 and the skirt 121 thereby providing the opening 16, for example, using a piece known as a blade, which is then removed during the moulding process providing the opening 16.

The profiled shape, here a rounded shape, of the curved wall 202 allows a reduction in the level of loading losses and enables the air to be effectively routed into the interior of the cover 12. This shape can also be obtained by axial unmolding.

FIG. 5 shows the air flow, indicated by the arrow F3, passing through the shaft 200. This Flow F3 is an additional axial flow. The flows F1 and F2 are as shown in FIG. 1. According to one characteristic, the flow F3 is originally axially orientated when it enters the shaft. This flow F3 is directed towards the face 164 of the bearing 6. The air flows F2 and F1 are also axial at the outset.

In this way, the air, which is circulated by the action of the ventilator 22, is channeled through the shaft 200. The air enters axially at the level of the free end of the wall 201 and is then diverted radially by the wall 202 before crossing the radial opening and cooling the diode 10, 10' in question. The flow F3 then passes through the opening 18 and finally re-emerges through at least one vent 162. In this way, the flow of air between the dissipaters 164, 1 is increased.

As a result of this arrangement, the air, which has been heated in particular by the collector plate 21, is not at risk of re-entering through the masked opening 16 for the greater part through the wall 202 constituting the base part of the shaft.

Using the shaft 200 thus avoids any faulty circulation of the air of the type F' shown in FIG. 1 as well as any eddying phenomena. The charging losses are thus avoided and a recirculation or reheated air into the cover 12 is avoided.

The air that passes through the shaft 200 is therefore more fresh because the diode 10 and/or 10' is more effectively cooled and thus more reliable.

It is also, therefore, more effective as the air circulates with a minimum of charging loss within the shaft, as the wall 202 favours the air flow.

The curvature of this wall depends upon the applications.

This arrangement allows, as shown above, the opening 16 to be increased axially and/or circumferentially in such a way that more fresh air is brought onto the diodes 10, 10', while avoid any reflow of warm air through the vents 162.

It will be noted that the flow F3 meets up with the flow F2 before crossing the air inlet opening 18 and entering the casing of the alternator, cooling the collector plate 21 and leaving through the vents 162 without re-entering the opening 16 because of the presence of the shaft 200.

Figure 3:
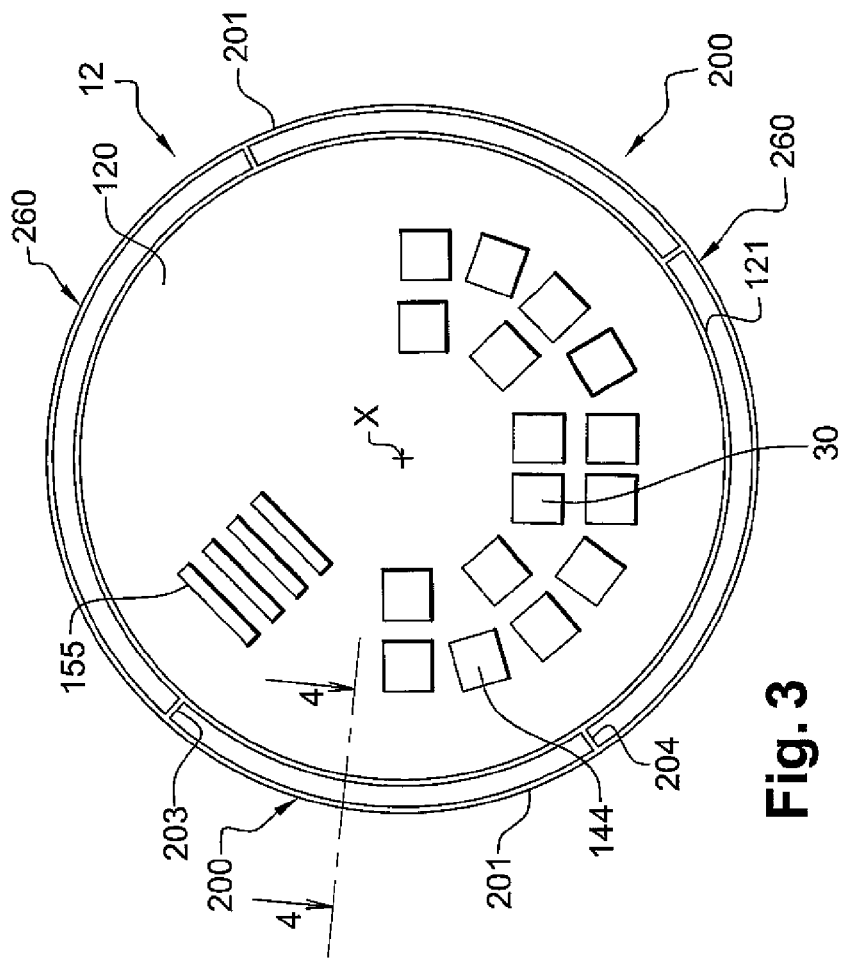
FIG. 3 is a rear view of a cover of a rotating electrical machine for a preliminary example of an embodiment according to the present invention.

In FIG. 3, the shaft covers a number of openings 16 and is associated with a number of negative 10 and positive 10' diodes, with the front face of the bearing 6 bearing six diodes 10 as in FIG. 1.

The shaft also covers at least phase outlet visible as 166 in FIG. 1 and each arranged in the vicinity of a negative diode 10.

According to one characteristic, the shaft 200 has a circumferential length that is greater than its radial height thereby reducing the radial dimension.

This shaft does not cover the skirt 161 of the rear bearing 6. It extends axially between the base 120 of the cover and the front face 164 of the bearing 6.

This shaft can be economically achieved by moulding, which allows all the components of the alternator, in particular the current rectification device 90, to be retained.

In FIG. 3, two shafts 200 have been provided.

In a general fashion, the shafts 200 are diametrically opposed and circumferentially of the same length.

Alternatively, the two shafts are circumferentially different in length.

FIG. 3 shows in reality two other diametrically opposed shafts 260, with a circumferential length greater than that of the shafts 200. The shafts 200, 260 extend over an angle of 360° thereby effecting a complete loop. These shafts 200, 260 sont are separated and re-attached to each other by the partitions 203, 204; they are generally radially orientated. These are the walls 203, 204. The axial dimension of the walls is greater than their radial dimension. In this way, the voltage regulator is thoroughly cooled.

The outer periphery of the cover 12 is thus formed from shafts that are adjacent to the skirt 121 that forms the inner wall of the shafts 200, 260.

Alternatively, in FIG. 3, only two shafts 200 or 260 are retained.

Figure 6:
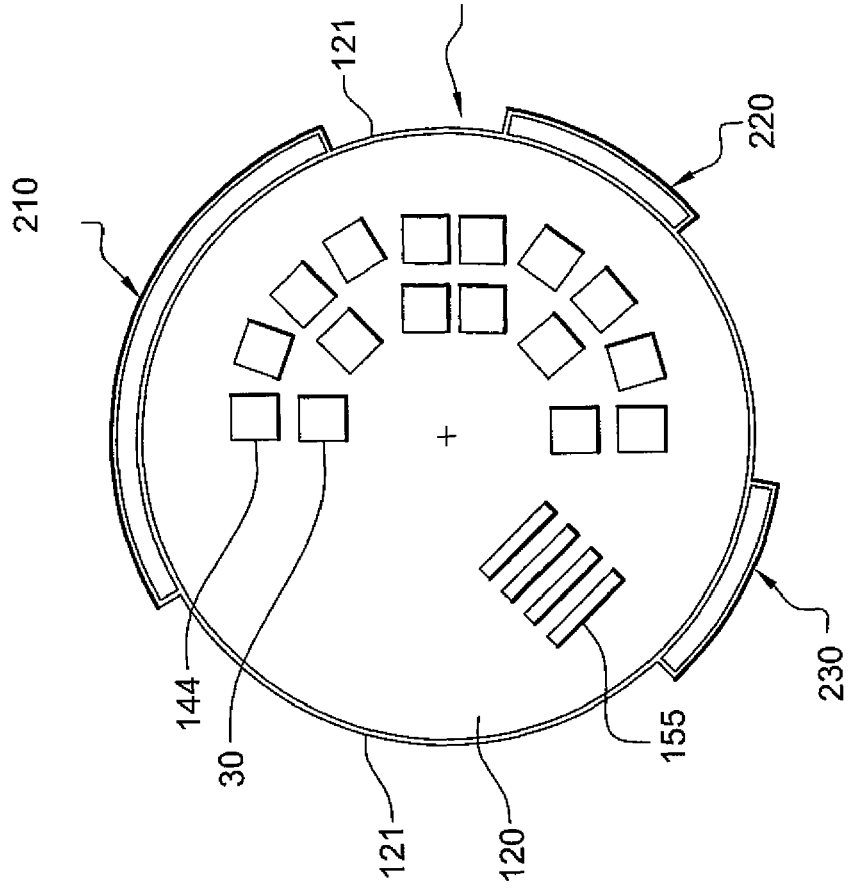

The embodiment shown in FIG. 6 provides for three axially orientated shafts 210, 220, 230 with a circumferential upper wall in the shape of a circular sector. The shaft 210 shown here has a greater circumferential length than that of the other two shafts.

Clearly, four or more than four shafts could be provided and/or the circumferential length of the shafts could be varied.

Figure 7:
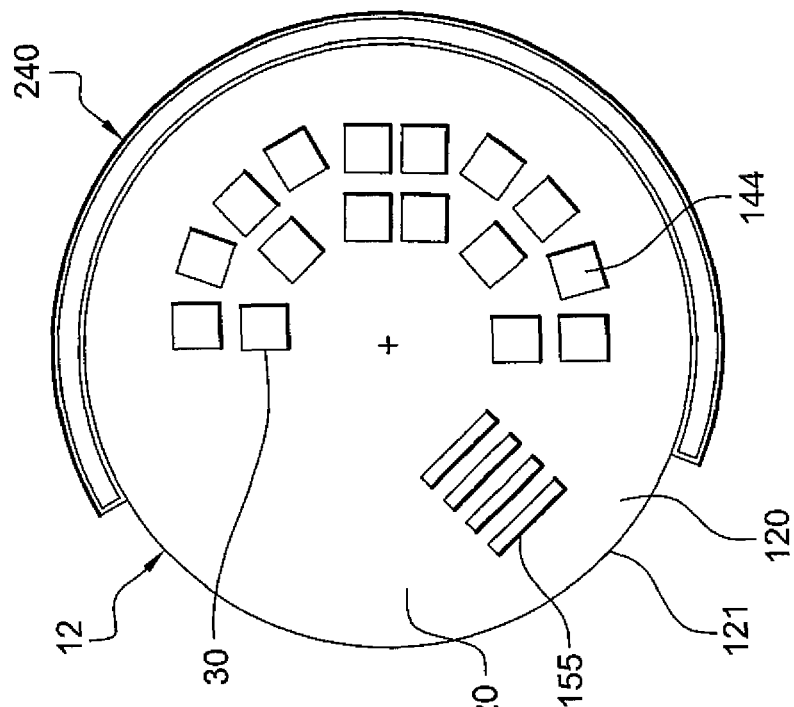
FIGS. 6 and 7 are views similar to FIG. 3 for respectively a second and a third embodiment according to the present invention.

In this way, the embodiment shown in FIG. 7 provides for a single shaft 240, which encompasses the three shafts in FIG. 6. This shaft extends to more than 180°.

The number of shafts will therefore depend on the applications and also in particular on the number of negative diodes 10 that become more heated. In the same way, the thickness and the height of the side walls 203, 204 will also depend upon the applications.

It is clear from the FIGS. 3, 6 and 7 that air inlets are created in specific zones in relation, in particular, to the number of negative diodes 10, that are more heated.

This is also true of the positive diodes 10', because the flow of channeled air F3 merges with the flow F2 at the level of the positive dissipater 1 so that the flows F3 and F2 circulate between the positive dissipater 1 and the negative dissipater 164.

In practice, the outlet or outlets 16 of the shafts are placed at the hottest places, in particular at the level of the negative diodes and the phase outlets.

Clearly, in certain applications, certain at least of the openings 16 installed outside the shaft or shafts can be blocked.

A supplementary shaft can be provided at the level of the openings 155 and thereby of the voltage regulator consisting of an electronic component.

Because of the air shaft or shafts, the flow of air passing beneath the positive dissipater is increased and the temperature of the diodes 10, 10' and/or of the voltage regulator is reduced, because the phenomena of heated air being recirculated, in particular by the collector plate 21, and the subsequent increase in temperature are avoided.

Because of the effect of the shaft or shafts, the range of temperatures between the diodes 10, 10' is reduced.

Clearly, as an alternative, the negative dissipater can be formed from a piece that is separate from the front face 164 of the rear bearing 6 and the walls 201 to 204 can be attached to the skirt 21 of the cover, for example, by sticking or soldering.

The structures may also be inverted. For example, in FIG. 3, according to one characteristic, the outer wall of the shafts can be formed, as an alternative, by the skirt 121 of the cover and the inner wall by means of a supplementary wall connected to the peripheral skirt by means of the side walls 203, 204.

The shaft or shafts are thus, in this case, adjacent to the skirt 121 installed inside the cover.

Alternatively, the shaft is arranged adjacent to the skirt 121 in two separate parts, respectively internal and external.

This embodiment allows the openings 16 to be easily obtained and the axial ends of at least certain vents to be sealed. This also enables the cover as known to the prior art, where the skirt constitutes the interior wall of the shaft, to be retained.

Figure 8:
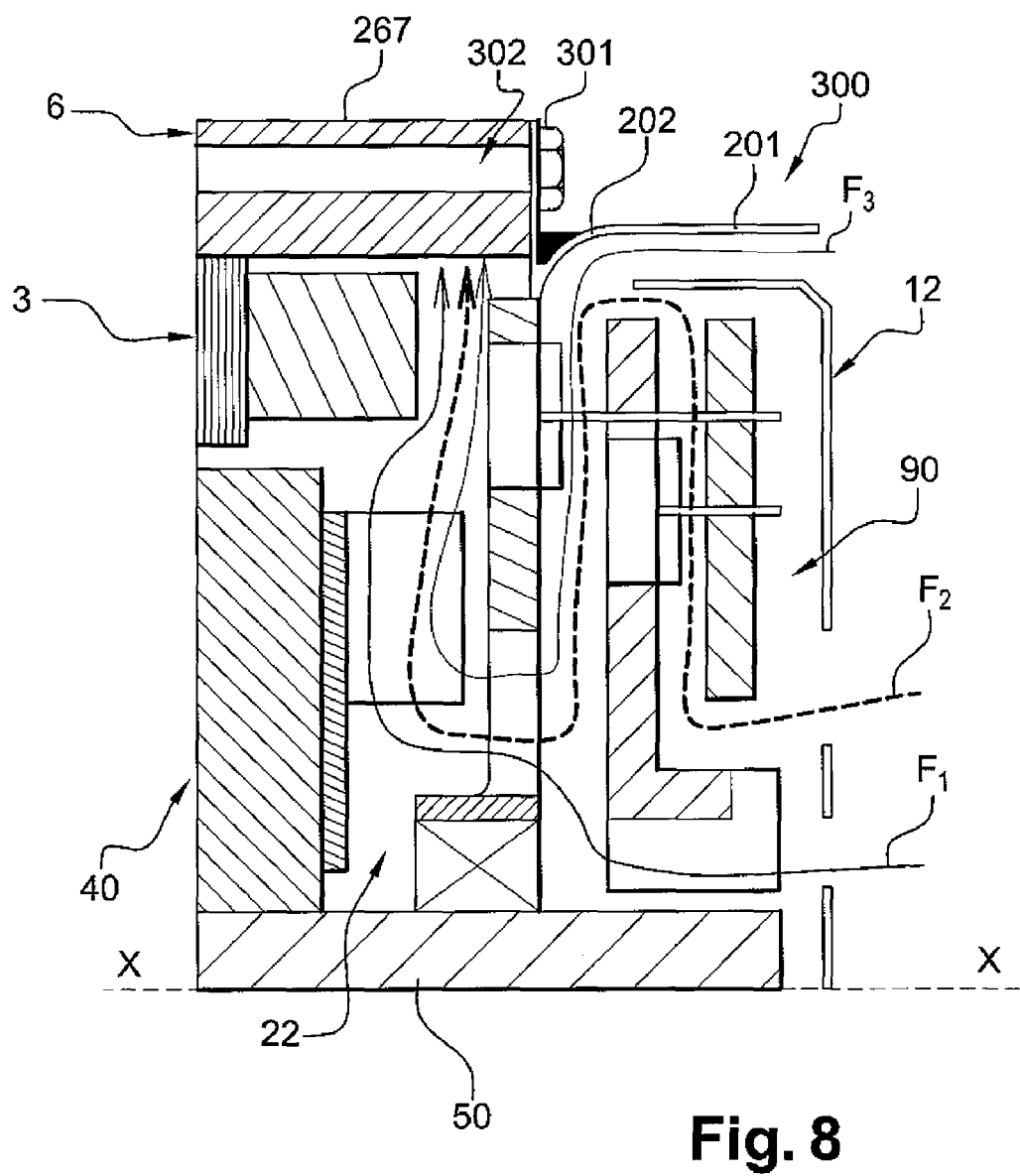
FIGS. 8 to 11 are view similar to FIG. 5 for respectively a fourth, a fifth, a sixth and a seventh embodiment according to the present invention.

In this way, the embodiment shown in FIG. 8, the shaft 300 has walls 201, 202 as in the FIGS. 3 to 7, but these walls are securely attached to an external piece 301 in the form of a plate 301 mounted on the rear bearing 6, in this case, by means of assembly straps 302 of the front bearing with the rear bearing 6 of the alternator. These straps 302 each cross in a known manner an area of excess thickness 267 of the bearing 6 and are screwed onto an area of excess thickness of the front bearing.

The plate 301, fitted with the walls 201, 202, is—according to a separate characteristic—part of the cover 12 of which the skirt 121 represents the inner wall of the shaft 300.

The outer part of the shaft is thus formed from the plate 301 and the internal part of the shaft by the cover 12, more precisely by the skirt 121. Through the intermediacy of its walls 201, 202, the plate 301 covers at least a part of the cover 12 and can be made of metal or a plastic material, for example and aluminium based material to improve the dissipation of the heat.

The plate 301 is in the form of an annular sector or a complete ring depending on the circumferential length of the shaft 200.

In this embodiment, the plate 301 descends to a sufficiently low level to block the axial end of at least one vent 162 affecting the front face of the rear bearing, that is to say, the radial part of a vent extending into a peripheral zone of the front face 164 constituting the base part of the bearing 6, in such a manner that the shaft carried out an additional function.

The internal angle of the plate 301 is here less than the internal angle of the skirt.

Alternatively, the plate 301 is replaced by supporting legs that form part of the wall 202.

Advantageously, there is also material present between the wall 202 and the supporting legs or the plate 301.

Figure 9:
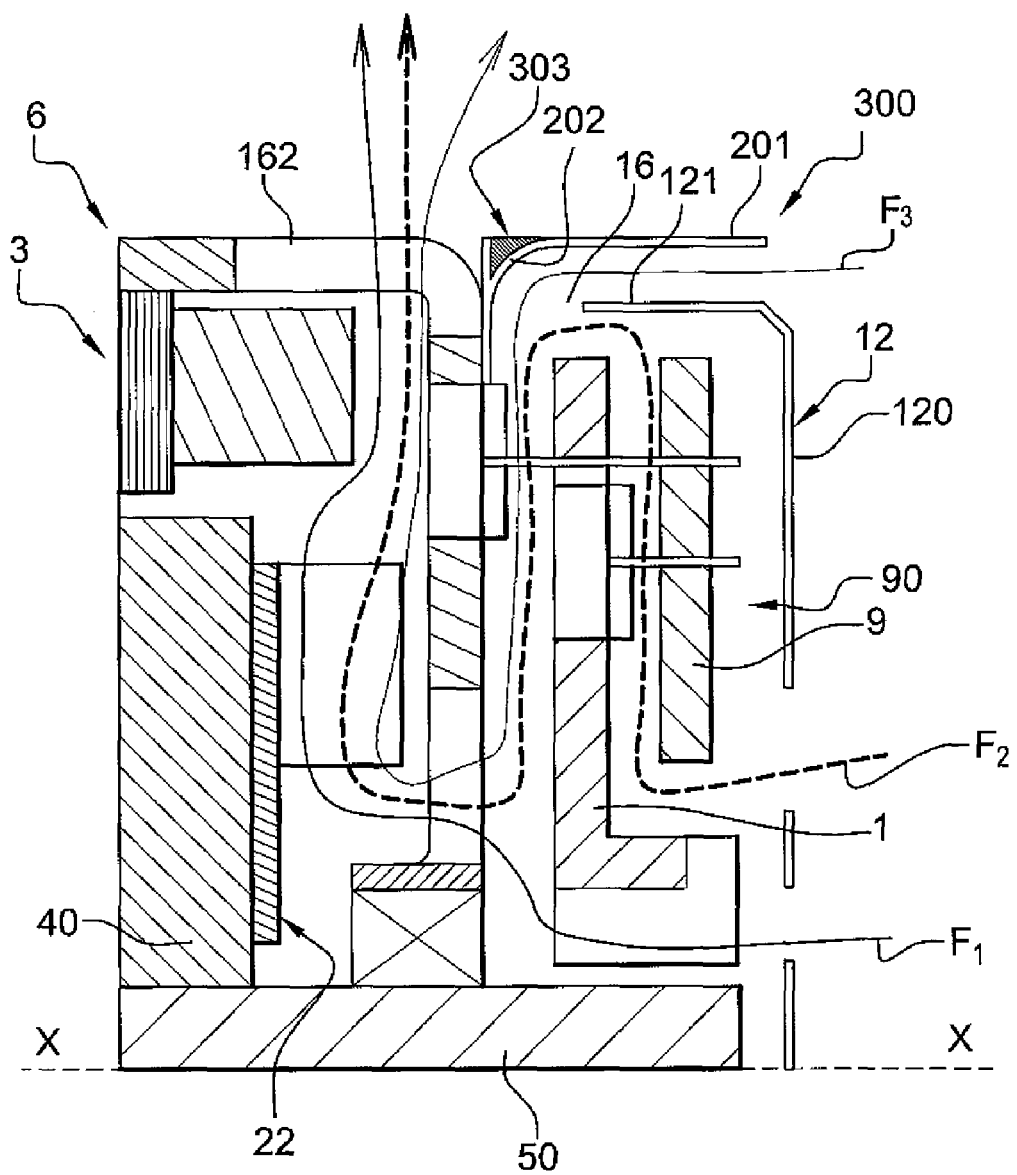

FIG. 9 shows the plate at a different place to the areas of excess thickness 267. The plate is shown as reference 303 because it descends radially to a lower level than in FIG. 8.

More precisely, it descends to a sufficiently low level to block the radial part of the vent 162 affecting the front face 164 of the rear bearing 6 and also to present an internal angle that is lower than the external angle of the positive dissipater and the external angle of the connector 9. As a result of this arrangement, the channeling of the flows F3 and F2 is improved.

Clearly, the plate 301, 303 can be attached by a ratchet system to the rear bearing 6 using axial ratchet clamps with hooks connecting with the lower edge of the radial part or a vent 162 forming part of the face 164.

Figure 10:
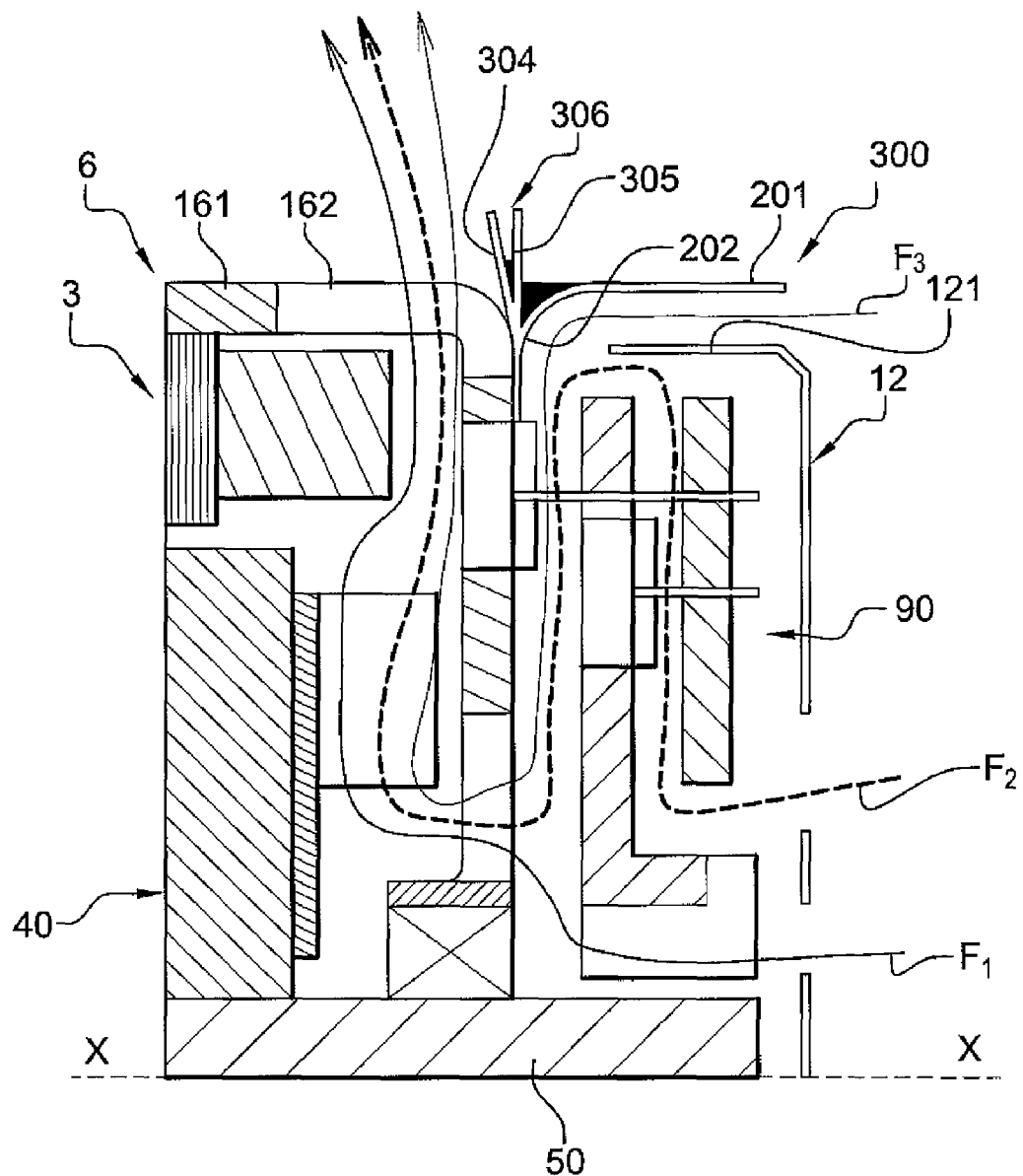

The plate may be shaped so that it forms, in accordance with the embodiment contained in FIG. 10, a piece 306 having a deflector 304 angled in such a way that the air carried away in the opposite direction of the cover 12.

More precisely, the piece 306, comprising the walls 201, 202 of the shaft 300, has, in an alternating manner, firstly a flat part 305 in the shape of a supporting leg at the level of the areas of enlarged thickness 267 to enable it to be mounted on the rear block 6, and secondly, an angled part 304 forming the angled deflector directing the airflow towards the free end of the skirt 161 of the bearing 6. Clearly, there is also material present between the wall 201 and the parts 305, 306.

In the FIGS. 8 to 10, the shaft 300 is in two parts, namely an outer part comprising the upper 201 and the curved 202 walls and an inner part formed from the skirt 121 of the cover 12 forming the internal wall of the shaft.

The opening 16 is blind at the level of the skirt 121 and is closed by an attached piece 301, 303, 306 mounted onto the bearing 6 in such a way that it is more easily obtained.

In a first stage, the first outer part is mounted, for example, by attaching it to the rear bearing by means of a ratchet system or by means of straps 302, and then in a second stage, the cover is mounted, for example by means of a ratcheting system. This is done at the end of the mounting sequence, that is to say, after the voltage regulator and the current rectifier component 90 have been installed.

As a result these procedures, the cover is simplified in FIGS. 3 to 7 and no greatly changed. It can be seen that the cover shown in FIG. 1 has been retained.

Moreover, the first external part of the shaft and the cover can be of the same, or of a different material.

In this way, in one embodiment, the cover is in a plastic material and the first part is either in plastic or metal, for example, an aluminium based metal, to improve the dissipation of the heat.

This arrangement also favours the formation of a metallic cover, with the first such being in one embodiment obtained by moulding and also being for example in a plastic material or in aluminium.

The first external part allows the formation of aerodynamic shapes, which perfectly espouse the contours of the rear bearing 6 and which enable the air flow to be improved, as can be seen for example in example in FIG. 10.

The internal angle of the first part can be reduced in the manner described above.

In one embodiment, the first part seals the radial part of at least certain vents 162, which in turn enables the recycling of warm air to be prevented.

Clearly, this configuration comprising two parts, allows the lateral walls 203, 204 of the shaft 200 to be retained or dispensed with.

The walls 202, 201 cover completely the opening or openings 16 in FIGS. 3 to 10.

More precisely, the walls 201, 202 have an axial length greater than the axial length of an opening 16.

Clearly, depending on the applications, the axial length of the wall 201 and thereby of the shaft can be reduced.

Figure 11:
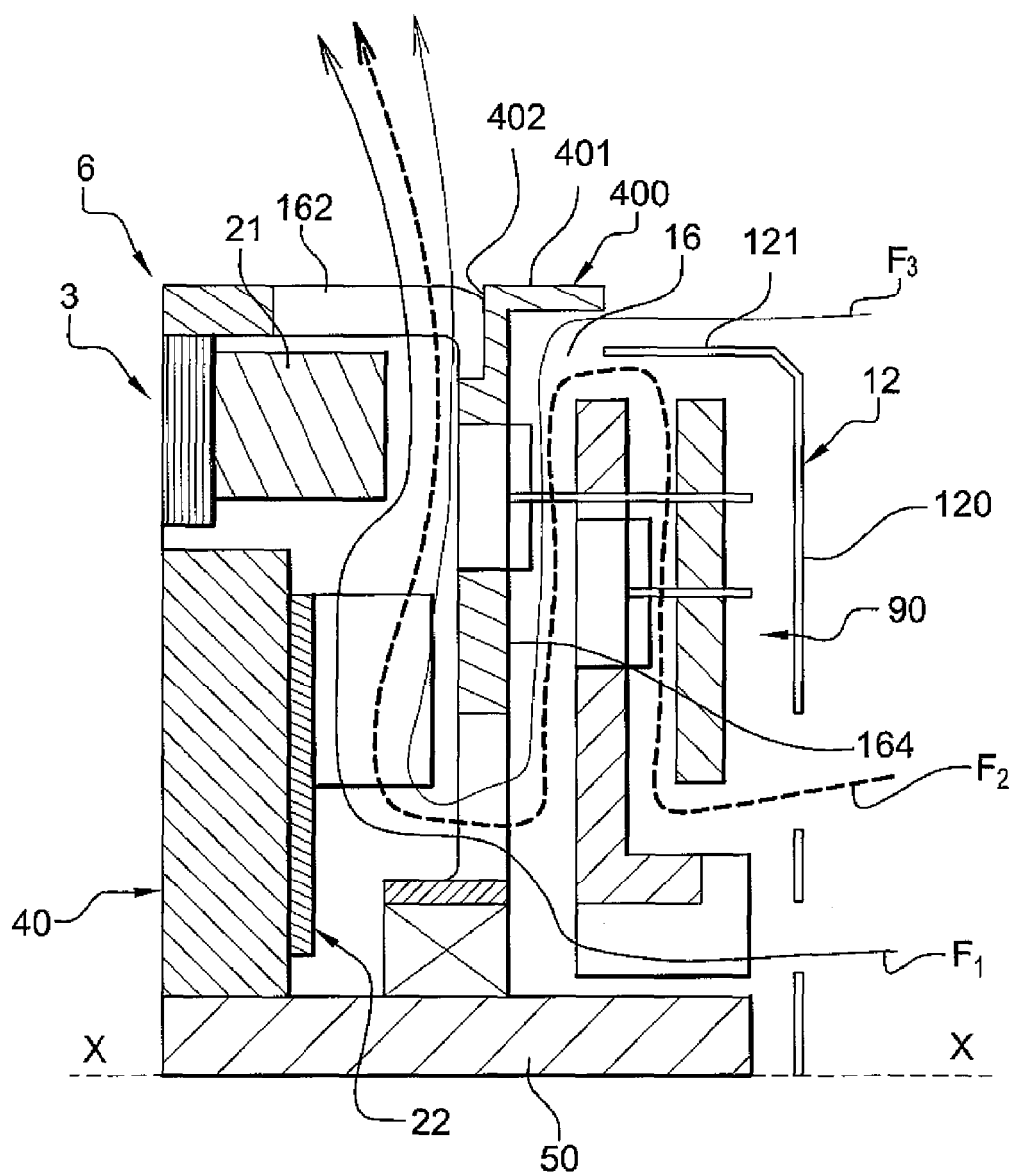

This is shown for example in FIG. 11.

In FIG. 11, the shaft 400 is shown in two parts, as in the FIGS. 8 to 10. The outer part 401, 402 is a single block with the bearing 6 and the internal part is formed by the skirt 121 of the bearing 12.

The first part 401, 402 comprises an axially orientated wall 401, which runs axially in the opposite direction of the ventilator and to the collector plate 21, that is to say towards the base 120 of the cover 12.

This wall 401 is circumferentially in the shape of a circular sector in the same way as the wall 201 and is joined to the face 164 by a transversely orientated section extending the face 164.

The section 402 replaces the wall 202 in FIG. 3 and constitutes the base of the shaft 400.

The first part 401, 402 was produced by moulding with the front face 164. The first part 401, 402 is of a lesser thickness than the face 164.

The wall 401 extends in a plumb manner in respect of the opening 16 and has here axially a length roughly equal to the axial length of the opening 16.

Alternatively, the axial length of the wall 401 is less than that of the opening 16.

For example, the axial length of the wall 401 is greater by at least 705 of the axial length of the opening 16.

Clearly, any kind of required shape can be given to the openings 16 and to the shaft or shafts as can be seen in the FIGS. 12 to 15. Similarly, the structures could be inverted in the manner indicated, the upper wall of at least one shaft belonging to the skirt 121 of the cover as can again be seen in the FIGS. 12 to 15.

Figure 12:
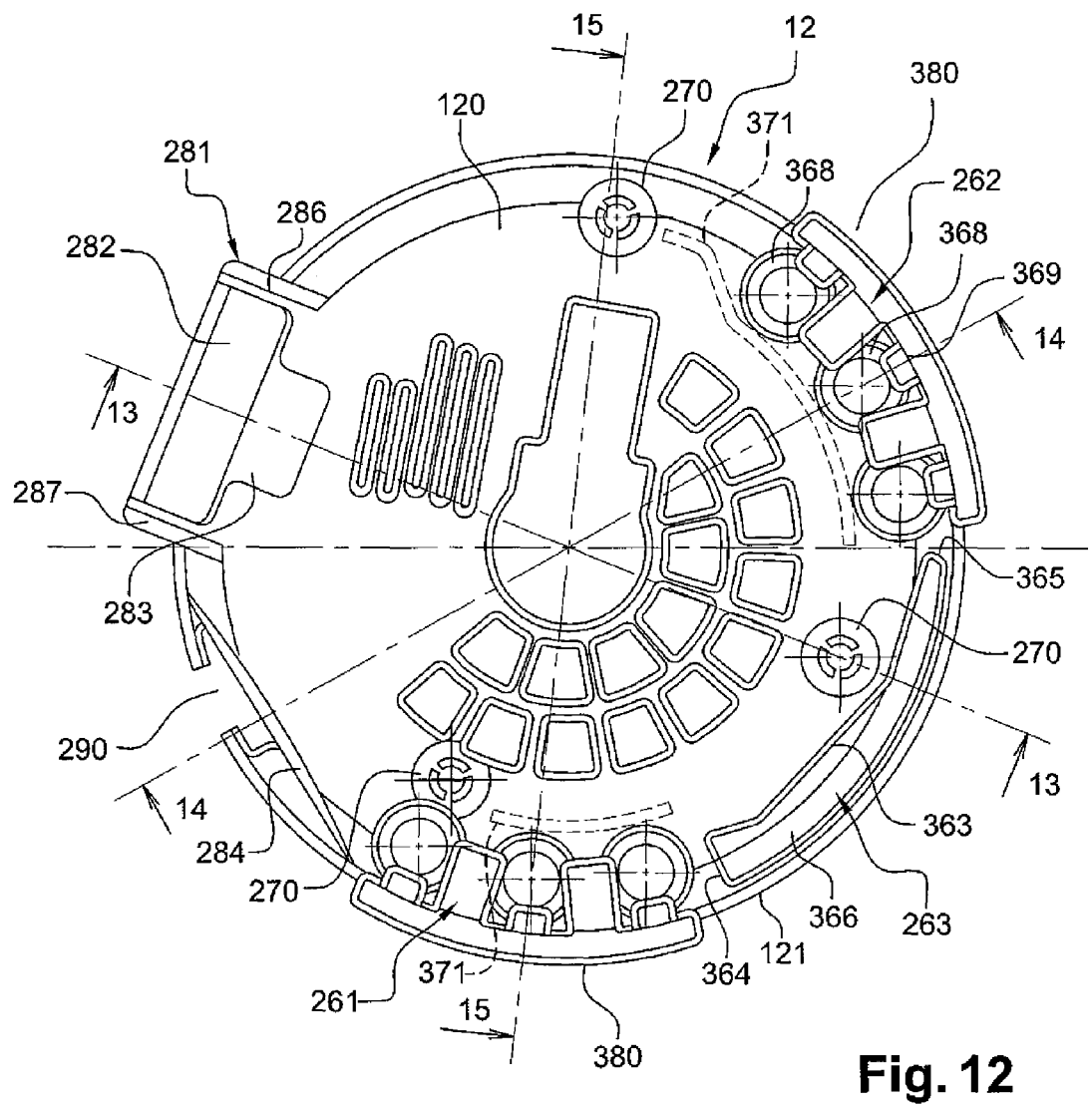
FIG. 12 is a rear view of the cover for an eighth embodiment according to the present invention.
Figure 13:
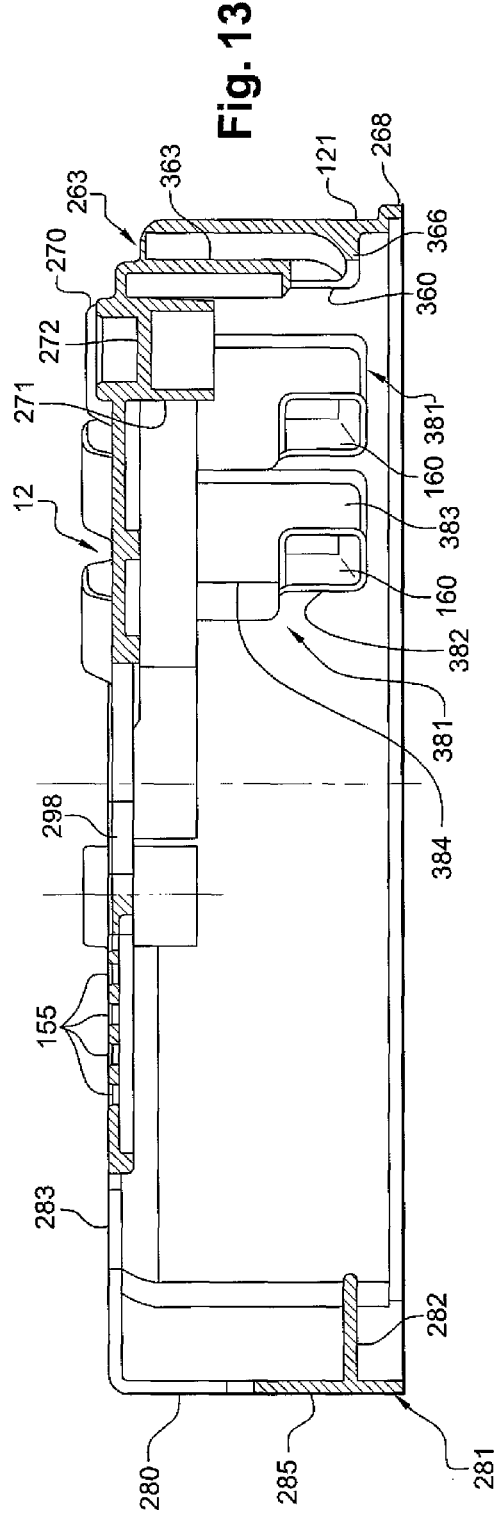

In FIG. 12 can be seen at 270 one of the three mounting points of the cover comprising elastically deployable tabs for a ratchet type mounting onto the studs that form part of the rear bearing as indicated in the document WO 01/69762. In a known manner, the threaded part of the stud penetrates the central opening of the point 270 and is thereby held firmly by its threaded part against the free end of the tabs. The position of the mounting points 270 depends upon the applications. These points 270 comprise a sleeve 271 which axially penetrates the cover, forming an axial projection outside the base part 120 of the cover (FIG. 13). This sleeve has a number of internal tabs 272. The sleeve has the purpose of making the base part 120 rigid.

Again in FIG. 13, at 280, a peripheral opening can be seen in a radial projection 281 of the cover, for the assembly of the connector associated with the voltage regular shown in FIG. 2 at 165.

The projection 281 has an upper wall 285 (FIG. 13 and FIG. 12) and two lateral walls 286, 287.

The reference 290 represents an opening for the terminal B+ shown as 500 in FIG. 1.

The size of the opening 290 depends on the size of the terminal B+.

The central opening 298 is intended for the passage of the alternator brush mount and has been specifically configured for this purpose.

The free end of the skirt 121 of the cover has a change in its diameter thus forming an annular rim in the form of a shoulder. This rim 268, the diameter of which is greater than that of the skirt 121, has an axially orientated part, the internal periphery of which is intended to engage closely with the outer periphery of the annual area of excess thickness of the centering 168 shown in FIG. 2. The rim 268 connects with the skirt 121 by means of a transverse shoulder piece 269, which is intended to press against the front face thereby delimiting the area of excess thickness 168 present below the vents 162 in the vicinity of the latter. In this way, air is prevented from entering the cover at a level of the rim 268.

According to one characteristic, as can be seen in FIGS. 12 and 13, the projection 281 has an internal, transversely orientated partition 282 next to the free end of the skirt 121.

In this embodiment, unlike that shown in FIG. 1, the connector associated with the voltage regulator ascends radially. The opening 280 affects the upper wall 285 of the projection 281 and is extended by a cutout section 283 in the form of a T, which is perpendicular in relation to the opening 280. The transverse base of the T is in the form of a cutout section which affects the base part 120 of the cover. The horizontal part of the T affects the projection 281 and is bordered by the lateral edges 286, 287 of the projection 281. The cutout section 283 in the base 120 allows for the shape of the connector (not shown). The cutout section 283 and the opening 280 enable the partition 282 to be obtained through the effect of axial unmolding.

The partition 282 is here rectangular in shape leaving a small space between the partition 282 and the lateral edges 286, 287 of the projection 281 thereby obtaining the partition 282 by axial unmolding. The partition 282 forms a single piece with the upper wall 285 of the projection and is interrupted by the opening 280 as can be seen in FIG. 13. The height of the partition is dependent upon the height of the horizontal part of the cutout section 283.

Clearly, the rim 268 is interrupted at the level of the projection 281, but this is compensated by the presence of the partition 282, which, according to one characteristic, prevents the axial passage of the air. This partition prevents the cover from being penetrated by any air coming from the radial part of the vents 162 opposite.

Any recirculation of hot air from the rear bearing, and in particular from the vents 162 of the latter, is prevented insofar as the voltage regulator is protected.

The rim 268 is also interrupted at the level of the opening 290.

The skirt 121 has, at this point, a flat piece 284 for the purpose of reducing the dimensions. This flat piece extends to the base 120 of the cover, stopping a short distance from the rim 268.

This embodiment contains three shafts 261, 262, 263 adjacent to the skirt 121. More precisely, the upper wall of each shaft is adjacent to the skirt 121, and even merging with the skirt in the case of the shaft 263. The shafts extend for at least the greater part of the inside of the skirt 121.

The shafts 261 and 262 are generally of the same shape and are mounted at the level of the six outlets of the windings of the phases of the coil of the stator.

The shaft 263 is oblong in shape and longer circumferentially that the shafts 261, 262 arranged on both sides of the shaft 263.

According to one characteristic, the upper wall of the shaft 263 is formed from the axially orientated skirt 121 of the cover, which ensures that the radial dimensions of the cover 12 are not exceeded.

The width of the shaft 263 is reduced at the level of the mounting point 270 adjacent to the shaft 263 (FIG. 12). This shaft 263 is bordered by an internal wall 363 formed by the base 120 of the cover and formed from a number of rectilinear sections, as can be seen in FIG. 12, so as not to interfere with the point 270 and to increase the circumferential width of the vent 263. The shaft 263 is bordered also by two axially orientated lateral walls 364, 365, which meet up at the wall 363 and the skirt 121. The wall 365, the closest to the point 270, is less high than the wall 364.

These walls 364, 365 meet up at the base 120 and extend axially inside the cover. The walls 364, 365 have the effect of making the skirt 121 and the base 120 of the cover more rigid.

The base part 366 of the shaft 263 forms a bridge between the walls 364, 365. This base part 366 has the effect of making the skirt 121 more rigid and is adjacent to the rim 268. It has a profiled shape in order to divert the air into the cover 12. The inner periphery of the base part 366 is formed from a number of rectilinear sections and its dimensions match those of the inner wall 363 of the shaft 263 so that the base part 366 part is obtained by axial unmolding. The air outlet 360 (FIG. 13) for the flow F3 crossing the shaft 263 is thus large circumferentially. This size is clearly greater than that of the openings 16 in FIG. 2.

Each shaft 261, 262 is associated with three types of phase windings and the alternator comprises a connector with six clips in the manner described above.

These outlets are each mounted in an axially orientated housing 370.

In this way, there are two groups of three such housings 370 arranged on both sides of the shaft 263.

Figure 14:
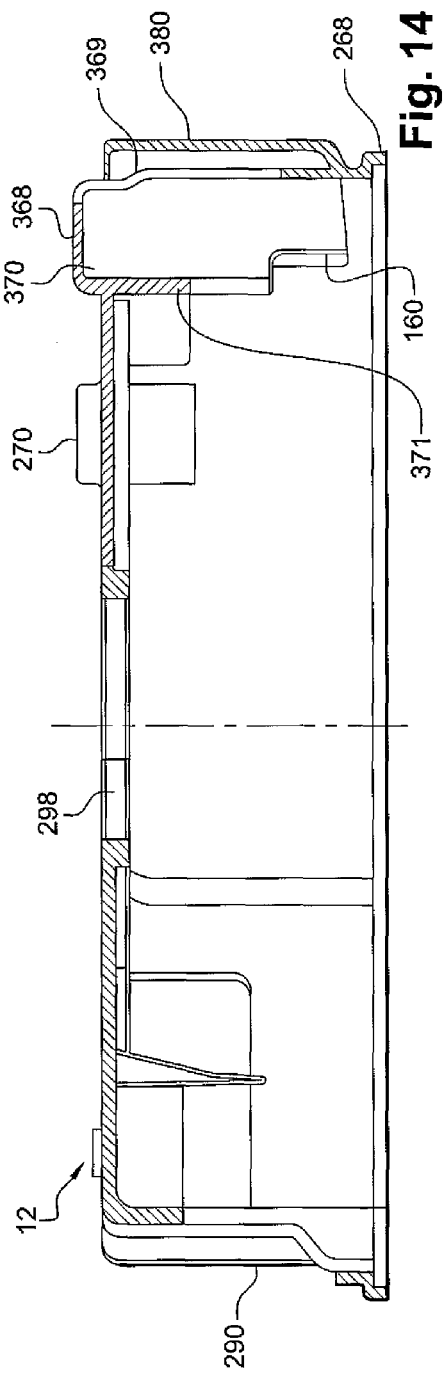

These housings 370 each have a base part 368 of circular section, forming an external protuberance with regard to the base part 120 of the cover, as can be seen in FIGS. 14 and 15.

The upper wall of these housings 370 is formed from the skirt 121 of the cover 12.

This upper wall comprises an axially orientated blind vent 369 as can be seen in FIG. 14. The vent is open at the level of the base 368 of the housing 370 and closed at a distance from the edge 268. The vent 369 is an evacuation vent, in particular for water.

The housing 370 is bordered by an internal wall 371, which extends in the form of an axial projection from the base part 120 of the cover 12. The wall 371 extends into the interior of the cover 12 over a short axial distance in relation to the axial length of the skirt 121. This wall has the effect of making the base 120 of the cover more rigid.

In one embodiment, the internal wall 371 is common to the three housings 370 of the shaft 262, as can be seen in broken lines in FIG. 12. This wall 371 extends below the shaft 262 in a winding manner to the vicinity of the point 270, the highest in FIG. 12. The wall 371 is common to two of the housings of the shaft 261, as a result of the presence of the mounting point 270 adjacent to one of the base parts (FIG. 12).

In this way, the internal wall 371 runs circumferentially between at least two base parts 368 and enables the air flow to be guided. It extends below the shaft in question over a shorter axial length than the latter.

The housings 370 are obtained by the axial unmolding of the interior of the cover 12, that is to say, in the direction of the free end of the skirt, unlike the shafts 261 to 263, which are obtained by axially unmolding in the reverse direction, that is to say in the reverse direction towards the outside of the cover 12.

The shafts 261, 262 are each bordered by an external wall 380 covering the three vents 369 and the three housings 370. The wall 380 extends from the base 120 to the vicinity of the edge 268 of the skirt.

The wall 380 projects radially in relation to the skirt 121 but, as can be seen in FIG. 12, this in only at a low height. This external wall 380 consists here of a local elevation of the skirt 121.

Each shaft 261, 262 comprises also two axially orientated conduits 381, each having an outlet 160 inside the cover 12, as can best be seen in FIGS. 13 to 15. These conduits have the effect of making the skirt 121 and the base 120 of the cover 12 more rigid.

The outlets 160 are axially offset in the direction of the rim 268, and thus the free end of the skirt 121, in relation to the wall 371.

The conduits 381 extend to the exterior of the wall 371 and between two housings 370. The lateral walls 382, 383 (FIG. 13) of the conduits form the lateral walls of two consecutive housings 370, between which is interposed the conduit 381.

The internal wall 384 of the conduit 381 extends from the base 120 of the cover 12 as far as the edge of the opening 160 with a radial offset of the edges of the opening 160 and the wall 384, made necessary by the presence of part of the mould, known as the blade, enabling the opening 160 to be formed during unmolding.

The end 386 (FIG. 15) of the conduit forms the base of the conduit 381. In one embodiment, this end is profiled in order to divert the air flow radially towards the interior of the cover. Alternatively, the end is not profiled. In this Figure, the end is slightly inclined.

The end side walls 382, 383 of the two conduits extend as far as the wall 380, which forms a local elevation of the skirt 121.

Clearly, as an alternative, each conduit can have a separate upper wall between two consecutive housings 370. The cross-section of the conduit is in general rectangular.

The internal walls of the shafts 261 to 263 all extend axially to the interior of the cover and have the effect of making the latter more rigid.

It will be noted that the side walls 382, 383 of the conduits 381, and also the side walls 384, 385 of the shaft 263, meet up at the base 120 of the cover 12 and at the inner periphery of the skirt 121.

The inner walls of the conduits 381 and the shaft 263 meet at the base 120 of the cover.

These side and internal walls have the effect of making the base of the cover more rigid.

The inner face of the base 120 of the cover is ribbed especially at the level of the strips of the material between the openings 144, 30 in order to increase the mechanical strength of the cover. A ribbed framework is arranged at the level of the openings 155. Similarly, the edge of the opening 298 is ribbed. These ribs on the inner face of the bas 120 can be seen in FIGS. 13 to 15 but for the sake of clarity no references are given.

It will be appreciated that the cover 12, shown here in a plastic material, is easily obtained by axial unmolding.

This cover is compact and very strong, due in particular to the walls of the shafts 261 to 263, to the walls 371 and to the ribbed structure that enables the amount of material used in the cover and thereby the cost to be reduced.

It will be observed that the wall 380 covers the vents 369 of the housings and protects these.

In FIG. 12, the shafts 261, 262 are shafts having two conduits 381. Clearly, the number of conduits 381 will depend on the number of windings and the number of the stator. Thus, by way of alternative, eight winding outlets are provided. The number of phases can be four or eight. In this case, two shafts each with four outlets, associated with three conduits 381 can be provided. It is also possible to arrange three series of two winding outlets and thus three shafts with two housings 370 separated by a conduit 381.

Clearly, the shafts in FIG. 12 can be modified so that they only comprise two conduits for three housings with vents 369 as can be seen in FIG. 16.

In this case, the vents 369 are of the free air type and each conduit has its own upper wall 480 formed by a local elevation of the skirt 121.

The total number of shafts is thus five, namely the shaft 263 and the four conduits 381.

From the above, it is clear that, as a result of the present invention, shafts can be installed in such a manner that they open out through their outlets 160 at the hottest places, therefore providing optimum cooling for the electronic component or components.

Advantageously, the ends 386 of the conduits 381, the base 366 of the shaft 263 and the partition 282 are all in the same transverse plane.

As a variation, the base parts 366, the ends 386 and the partition 282 that are arranged on the same level, can be joined together by a band of material forming a transversely orientated collar replacing the rim 268. This collar can be mounted on the areas of excess thickness 267 by means of straps 302 or by the use of a ratchet system in such a way that the mounting points 270 may be dispensed with.

Clearly, by way of an alternative, the mounting points 270 can be retained. As a further alternative, the collar is not continuously circular.

The collar, or a part of the collar, covers at least part of the radial ends of the vents as shown in FIGS. 8 to 10.

It will be noted that in this case the ends 366, the partition 282 and the base parts 366 cover all or a part of the radial ends of the vents 162.

Clearly, the present invention is not limited to the embodiments described above.

The skirt of the cover is, by way of an alternative, fitted with hooked ratchet type clips to engage with the edge of the radial part of a vent 162 to create a ratchet type securing system as described, for example, in the document U.S. Pat. No. 5,315,195 to which further reference will be made below.

It will be noted that the shapes of the radial parts of the of the vents 162 shown in this document U.S. Pat. No. 5,315,195 also enables the pieces 303 and 306 in FIGS. 9 and 10 to be secured by means of a ratchet system.

The points 270 are thus not obligatory.

Different combinations can be envisaged.

For example, the shaft 220 or 230 in FIG. 6 can be replaced by a shaft 400 in FIG. 11.

This shaft 400, or the outer part of the shaft 300 can be connected to an alternator in which, in a manner indicated above, the cover is in a single block with the rear bearing.

One of the shafts 200 in FIG. 3, or the shaft 210 in FIG. 6, can be replaced by a shaft 300 as shown in FIG. 9 or 10.

The three types of shafts indicated in FIG. 6 can be envisaged.

A supplementary shaft can be added at the level of the voltage regulator or, for example, as shown in FIG. 3.

Depending on the temperature of the components inside the cover, a single shaft could be envisaged together with a single radial opening 16, 160 for the air leaving the shaft to cool the hottest component.

The cooling shaft or shafts can be radially offset towards the interior or the exterior. For example, in the embodiment shown in the FIGS. 12 to 16, the upper and lower walls of the shafts can be offset towards the outside in such a way that the internal walls of the shafts are formed from a local depression or a local elevation of the skirt 121, or even by the skirt 121 itself.

In FIGS. 12 and 16, the upper walls 380, 480 respectively of the shafts 261, 262 and the conduits 381 are formed by a local elevation of the skirt 121. As an alternative, an offset in the direction of the interior can be envisaged so that the upper walls 380, 480 are formed by a local depression of the skirt 121 or by the skirt itself.

Offsetting in the direction of the outside is a more significant variation in that, in one embodiment, the shaft can project radially in relation to the face 164, while also being removed or offset axially in relation to the outer periphery of the bearing 6 with vents 162.

At the same time, it is possible to vary the diameter of the skirt in relation to outer diameter of the face 164 of the bearing 6. This diameter of the skirt can thus be less than, equal to or greater than the outer diameter of the face 164.

Clearly, for unmolding reasons, tapered areas can be envisaged at the level of the walls of a cooling shaft.

The entrance to the shaft or shafts can, as an alternative, be widened to increase the inflow of air.

Similarly, it might be envisaged that the base parts 366 and 402 of the shaft 400 could be profiled to improve the radial displacement of the air into the interior, as shown in the other figures.

As a further alternative, the shaft or shafts could be inclined.

In this way, in one embodiment, the upper wall of the shaft is inclined, for example, in the form of a truncated cone.

The shaft can be inclined in relation to the axial direction.

In the embodiments described above and represented in the figures, the invention is applied to a rear bearing of an alternator, onto which has been mounted the rectification device 90, which represents the hottest part of the alternator.

As an alternative, the rectification device can be carried by the front bearing of the alternator in such a way that the invention can also be applied to the front bearing of an alternator.

The invention applies equally in the case of an alternator in which one of the bearings is cooled by water and the other by air. The casing of the alternator can comprise more than two parts, for example, three parts, namely a front bearing, a rear bearing and an intermediate part installed between the two bearings and attached to these, for example, by screwing.

Moreover, the invention also applies to rotating electrical machines fitted, in a general manner, with a current converter, whether this is in the form of a current rectifier device, known as a rectifier bridge, as in the embodiments described above, or in the form of an undulating or sectioning device, as in the case of the starter-alternator. The undulating device described in the document WO 01/69762 is an alternative integrated into a cover in accordance with the present invention.

Clearly, as can be seen in FIG. 2 of the document WO 01/69762, the protective cover can surround the electronic components, such as a voltage regulator, and also the mountings for the sensors that capture the position of the rotor; the current rectification components in this case are arranged outside the bearing/cover assembly. At least one shaft can open out at the level of the voltage regulator and at least one other at the level of the mounting for the sensors that capture the position of the rotor, so as to optimise the cooling of the sensors.

The diodes 10, 10', constituting the current rectification components, can be replaced by transistors of the MOSFET type or similar.

The negative dissipater can be separate from the front face of the rear or the front bearing, while being fixed to this latter, because of the fact that, due to the shafts, the flow of cooling air can be directed to the places required.

This negative dissipater can be provided with fins.

The positive dissipater 1 can be of a different shape consisting in, for example, a perforated plate allowing the passage of one or more axial flows of air. Advantageously, fins can be added to this plate with the aim of improving the evacuation of the hear. The fins 4 are therefore not necessarily arranged in the internal periphery of the positive dissipater 1.

The invention is thus applicable to a starter-alternator of the chip or mezzanine type as described in the document WO 2004/040738

As a result of the invention, the axial air intake openings 155, 144, 30 can be retained and the arrangement of the electronic components, such as the current rectification device 90, does not need to be modified, with the result that standard components can be retained.

As a result of the invention, it is possible to retain the rotor, the coiled stator, the ventilator or ventilators and the other components of the electrical rotating machine. In this way, this machine is, as an alternative, fitted with a rear ventilator 22 comprising at least two superimposed ventilators as described for example in the document FR 2 855 672. Permanent can be installed between the teeth of the polar wheels of the claw-type rotor. The number of phases of the electrical rotating machine can be as many as required.

Clearly it is not possible for the air flow vents 162 and the air inlet openings 18 of the front and rear bearings to be modified, because the shaft or shafts are axially offset in relation to the skirts of the bearings.

The internal ventilation system for the cooling of the electrical machine is there not modified at the level of the vents 162 and there is no increase in the radial dimensions at the level of the bearing skirts.

One or more cooling shafts is formed.

The outlet of the shaft, constituting the radial opening for the passage of air, can be part of the skirt and can be closed as it is completely bordered by the skirt or, alternatively, it can be blind by being created inside the skirt at closed by means of a piece such as is shown in the FIGS. 8 to 10.

The outlet of the shaft can be arranged inside the skirt as show in FIGS. 12 to 16. This will depend upon the applications.

The solution according to the invention allows numerous embodiments to be produced, it is economical and it also enables the power and the reliability of the of the rotating electrical machine to be improved because of the more effective cooling of the electronic component or components and furthermore because it prevents the problem of hot air being recirculated.

The invention claimed is:

1. Protective bearing/cover assembly, for an internally ventilated rotating electrical machine, having centrally an axially orientated axis and comprising at least one electronic component carried by the bearing and protected by the cover having at least one radial opening for the passage of air, at least one axial opening for the entry of air, a generally axially orientated skirt and a generally transversely orientated base part, in which is fitted the axial air inlet opening, which is offset axially in relation to the radial opening for the passage of air, further comprising at least one shaft for the cooling of the electronic component adjacent to the skirt of the cover, wherein the shaft is generally axially orientated, and wherein the radial opening for the passage of air constitutes the outlet of the cooling shaft and wherein the skirt constitutes one of the internal and upper walls of the cooling shaft.

2. Assembly in accordance with claim 1, wherein the cooling shaft is offset axially in relation to outer periphery of the bearing.

3. Assembly in accordance with claim 2, wherein one of the internal upper walls of the cooling shaft is formed from a local depression or elevation of the skirt of the cover.

4. Assembly in accordance with claim 2, wherein the base part of the cooling shaft connects with the upper wall of the cooling shaft and is profiled in such a way as to propel the air radially into the interior of the cover.

5. Assembly in accordance with claim 2, wherein the axial length of the cooling shaft is equal to or less than 70% of the axial length of the radial opening for the passage of air.

6. Assembly in accordance with claim 2, wherein the cooling shaft is moulded together with the cover (12).

7. Assembly in accordance with claim 6, wherein the cover comprises at least three cooling shafts.

8. Assembly in accordance with claim 7, wherein the cooling shafts extend for at least the greater part inside the skirt of the cover.

9. Assembly in accordance with claim 8, wherein the cooling shafts are bordered by side walls, which meet at the base of the cover and at the inner periphery of the skirt of the cover.

10. Assembly in accordance with claim 8, wherein at least one of the shafts is interposed between at least two housings, each capable of housing a phase winding outlet contained in the rotating electrical machine.

11. Assembly in accordance with claim 10, further comprising two groups of three housings wherein each group of housings comprises two conduits both interposed between two separate housings.

12. Assembly in accordance with claim 1, wherein the cooling shaft is in two parts, comprising an inner part and an outer part, wherein the outer part is separate from the inner part forming part of the cover and wherein the upper wall of the cooling shaft is a part of the outside part.

13. Assembly in accordance with claim 12, wherein the outer part of the shaft is secured to the bearing.

14. Assembly in accordance with claim 13, wherein the outer part of the shaft comprises an angled deflector to divert the air flow into the opposite direction of the cover.

15. Assembly in accordance with claim 13, wherein the two conduits are a part of the shaft and wherein the upper wall of the shaft covers the three housings.

16. Assembly in accordance with claim 13, wherein the two conduits constitute the shafts.

17. Assembly in accordance with claim 12, wherein the outer part of the shaft is moulded together with the bearing.

18. Rotating electrical machine consisting of an internally ventilated alternator or starter-alternator comprising a stator and a rotor housed in a casing comprising at least one bearing, characterised in that the bearing is part of an assembly in accordance with claim 1.

* * * * *